(No Model.)
H. P. AMOS.
FLUID CONTROLLED VALVE.
No. 531,892. Patented Jan. 1, 1895.
Fig: 1.
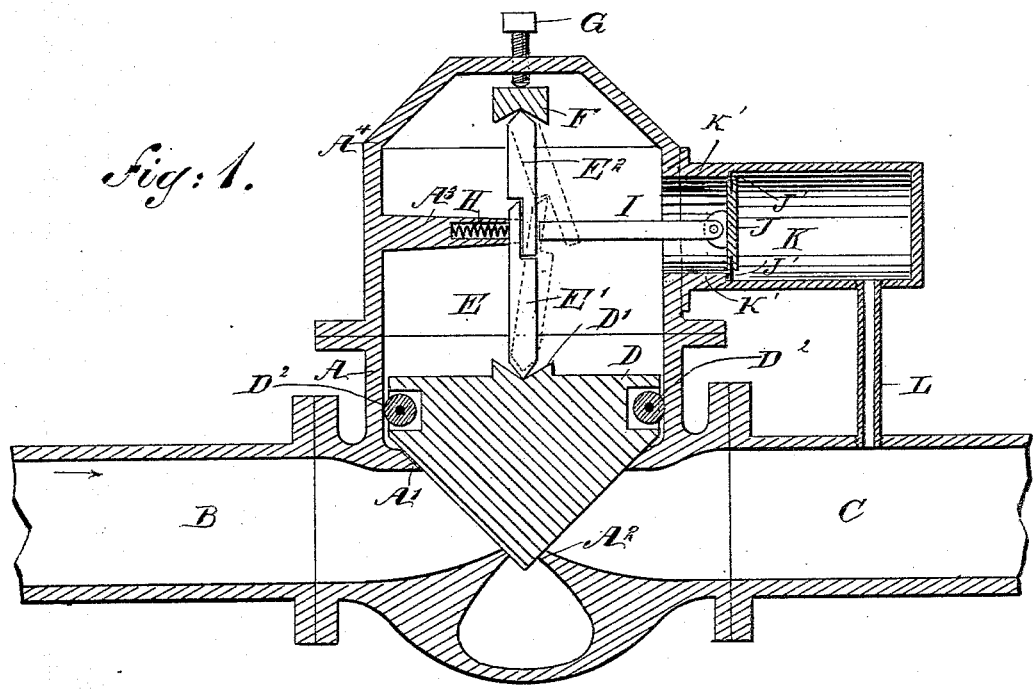
Fig: 2.
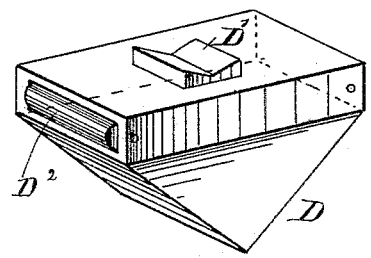
WITNESSES:
Chas. Nida.
C. Sedgwick
INVENTOR
H. P. Amos
BY
Munn & Co.
ATTORNEYS.

UNITED STATES PATENT OFFICE.

HENRY P. AMOS, OF CHICAGO, ILLINOIS.

FLUID-CONTROLLED VALVE.

SPECIFICATION forming part of Letters Patent No. 531,892, dated January 1, 1895.

Application filed January 5, 1894. Serial No. 495,801. (No model.)

*To all whom it may concern:*

Be it known that I, HENRY P. AMOS, of Chicago, in the county of Cook and State of Illinois, have invented a new and Improved Fluid-Controlled Valve, of which the following is a full, clear, and exact description.

The invention relates to valves for automatic fire extinguishing apparatus, and its object is to provide a new and improved valve, which is simple and durable in construction, very effective and automatic in operation, and not affected by an increase in the water pressure.

The invention consists of certain parts and details, and combinations of the same, as will be fully described hereinafter and then pointed out in the claims.

Reference is to be had to the accompanying drawings, forming a part of this specification, in which similar letters of reference indicate corresponding parts in both the figures.

Figure 1 is a sectional side elevation of the improvement; and Fig. 2 is a perspective view of the valve plug.

The improved fluid controlled valve is provided with a valve casing A, connected at one side with the water supply pipe B and at the other side with the pipe C, leading to the sprinkling system and charged with a fluid under pressure, say air to the extent of about ten pounds.

In the valve casing A, are arranged the valve seats A' and A² engaged by the valve plug D, as is plainly shown in Fig. 1, the said valve plug being provided on top with a step D' engaged by the knife edge end of the part E' of the two-part valve stem E, having its other part E² engaging a block F pressed on by a set screw G screwing in the cap A⁴ of the valve casing A. The connection between the part E² and the block F, is similar to the connection of the part E' with the step D', and the two parts E' and E² when extended, as illustrated in Fig. 1, form a straight stem for securely holding the plug D on its seats A' and A² against the pressure of the water in the pipe B.

The two-part valve stem E when opened, as illustrated in dotted lines in Fig. 1, releases the plug D so that the water pressure will force the said plug D upward in the casing A, whereby a free discharge for the water is formed in the casing A, to permit the water to pass from the water supply pipe to the pipe C leading to the sprinkling system.

In order to open the two-part valve stem E, the following device is provided: The upper end of the part E' is pressed on by a spring H held in a hollow arm A³ projecting inward from the cap A⁴. The lower end of the other part E² abuts against a piston rod I, arranged in an opposite direction to the spring H, and held on a piston J fitted to slide in the cylinder K connecting at its inner end with the cap A⁴ and having its outer closed end connected by a pipe L with the pipe C. Now, the fluid in the pipe C exerts pressure on the piston J, as the fluid can pass through the pipe L into the closed end of the cylinder K. The piston rod I is thus held in contact with the lower end of the part E², so that the other part E' abuts against the arm A³ and is pressed on by the spring H, and the two-part stem remains in a vertical position to keep the plug D to its seat. Now when the pressure of the fluid in the pipe C is reduced by any cause whatever, then the spring H will overbalance the fluid pressure on the piston J, so that the two-part stem E will open as indicated in dotted lines in Fig. 1, whereby the plug D is unlocked and the pressure of the water from the pipe B, will force the plug upward to permit the water to flow to the pipe C and to the sprinkling system.

The cylinder K is preferably provided with a seat K' on which is adapted to be seated a flange J' preferably made of rubber and extending from the edges of the piston J. This arrangement avoids all chance of the piston J sticking in the cylinder K as soon as pressure is removed. In the sides of the polygonal head of the valve plug D are arranged friction rollers D² adapted to travel on the inner faces of the valve casing A to prevent undue friction when the valve plug moves up and down.

Having thus fully described my invention, I claim as new and desire to secure by Letters Patent—

1. A fluid controlled valve, comprising a valve casing containing a valve plug, a two-part stem for holding the said plug to its seat, a spring pressing on one side of the stem, and a cylinder having a piston that is operatively connected with the said stem said cylinder being arranged on the opposite side of the stem from the spring, substantially as shown and described.

2. A valve provided with a two-part stem the bearing points of whose sections normally approximately align to keep the valve on its seat, an abutment for the joint of the stem sections, and a pressure device for forcing the joint against the said abutment, substantially as described.

3. A valve provided with a stem comprising two parts which normally align to hold the valve to its seat, a pressure device for forcing the joint in one direction to bring the stem sections in alignment, and a spring acting in the opposite direction to the pressure device to assist in bringing the stem sections out of alignment, substantially as described.

HENRY P. AMOS.

Witnesses:
EDWIN G. PATTEE,
MILO J. WILLIAMS.